(No Model.)
F. C. PECK.
SODA WATER APPARATUS.
No. 504,849. Patented Sept. 12, 1893.
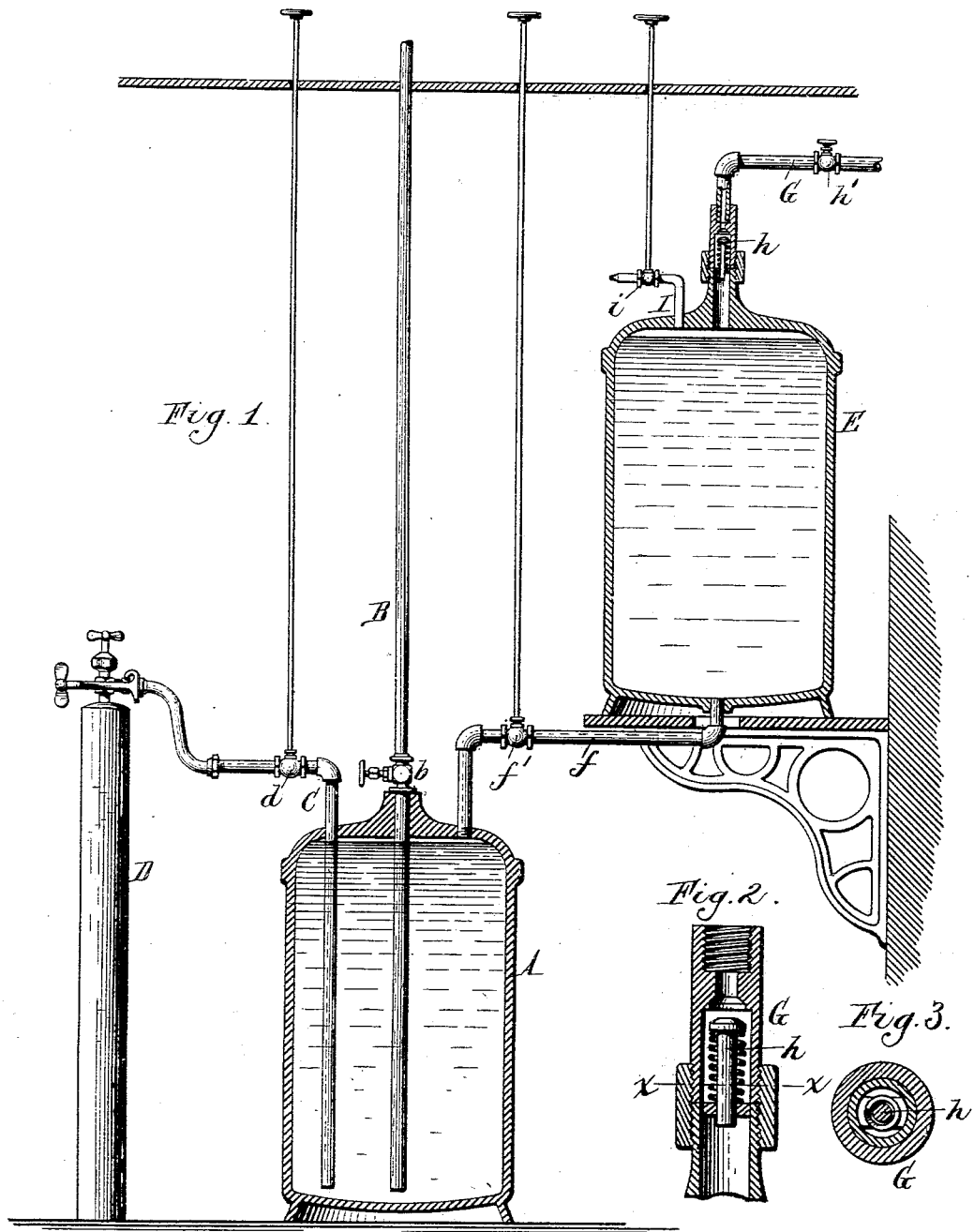

UNITED STATES PATENT OFFICE.

FRED C. PECK, OF BUFFALO, NEW YORK.

SODA-WATER APPARATUS.

SPECIFICATION forming part of Letters Patent No. 504,849, dated September 12, 1893.

Application filed August 15, 1892. Serial No. 443,108. (No model.)

*To all whom it may concern:*

Be it known that I, FRED C. PECK, a citizen of the United States, residing at Buffalo, in the county of Erie and State of New York, have invented new and useful Improvements in Soda-Water Apparatus, of which the following is a specification.

This invention relates to an apparatus for charging soda-water fountains and has for its objects to provide a simple apparatus which permits the fountain to be charged without the necessity of disconnecting it from the supply pipe leading to the dispenser and to reduce the waste of gas, in charging, to a minimum.

In the accompanying drawings:—Figure 1 is a sectional elevation of my improved apparatus. Fig. 2 is a vertical section on an enlarged scale of the automatic or check valve arranged in the inlet pipe of the water reservoir or chamber. Fig. 3 is a cross section in line $x$—$x$, Fig. 2.

Like letters of reference refer to like parts in all the figures.

A represents the fountain or vessel in which the water is mixed with carbonic acid gas and placed under pressure, and B is the delivery pipe whereby the soda-water is conducted from the fountain to the dispenser, which latter is not shown in the drawings and may be of any ordinary construction. The delivery pipe B extends nearly to the bottom of the fountain and is provided outside of the fountain with a stop cock $b$.

C is the gas supply pipe entering the fountain and extending nearly to the bottom thereof. This pipe is connected with a cylinder or vessel D containing carbonic acid gas under pressure and is provided with a stop cock or valve $d$ for controlling the flow of gas to the fountain.

E is a water reservoir or chamber arranged above the level of the fountain A and from which water is supplied to the fountain through a pipe $f$ leading from the bottom of the reservoir to the fountain. This pipe is provided with a valve or stop cock $f'$.

G is the inlet pipe of the water reservoir which is connected with a service pipe or other source of supply, not shown in the drawings.

$h$ is an automatic or check valve arranged in the inlet pipe G and which permits the water to enter the reservoir E through the inlet pipe G but prevents any gas in the reservoir from escaping into the inlet pipe.

$h'$ is a stop cock arranged in the inlet pipe for controlling the admission of water to the reservoir.

I is a relief pipe connected with the upper part of the reservoir for allowing a portion of the gas to escape, if necessary, in charging the fountain. This relief pipe has a stop cock $i$.

The parts of the apparatus are preferably located in the cellar or basement of the building and the stems or handles for operating the valves of the gas supply pipe C, the water pipe $f$ and the relief pipe I extend upwardly through the floor above and terminate near the dispensing apparatus, so as to be in convenient reach of the attendant.

In first charging the fountain A, the valves of the gas supply pipe C, the delivery pipe B and the relief pipe I are closed and those of the inlet pipe G and the water pipe $f$ are opened. Water will now enter the reservoir E and flow from the latter into the fountain A through the pipe $f$. When the fountain has been filled with water, the valve of the water pipe $f$ is closed and the valve of the gas supply pipe C opened. Compressed carbonic acid gas now enters the fountain, becomes mixed with the water in the same and at the same time places the contents of the fountain under pressure, ready to be dispensed.

When the contents of the fountain are exhausted, the fountain is recharged in the following manner:—The supply of gas to the fountain is first shut off by closing the valve $d$ and the valve of the water pipe $f$ is then opened. A portion of the carbonic acid gas in the fountain now passes into the water reservoir through the water pipe $f$, thus equalizing the pressure in both of these vessels and allowing the water in the reservoir to flow by gravity into the fountain and fill the same. When the fountain is filled, the valve of the water pipe $f$ is again closed to cut off communication between the fountain and the reservoir, and the valve of the gas supply pipe C is again opened to admit carbonic acid gas to the fountain and place the charge under pressure. In case the gas pressure in the reservoir exceeds the water-pressure in the service pipe after allowing the gas to escape from the fountain into the reservoir, the gas pressure may be sufficiently diminished to allow the water to enter the reservoir by opening the relief valve $i$, the valve being again closed as soon as the pressure is sufficiently reduced.

In my improved apparatus the fountain, when empty, is not disconnected or replaced by another charged fountain, but remains permanently connected to the pipe leading to the dispenser, except when it is necessary to remove it for repairs, thus saving the time and labor incident to changing the portable fountains heretofore employed and enabling the soda-water to be drawn without interruption while charging the apparatus. The waste of carbonic acid gas involved in changing portable fountains is also obviated in my apparatus, as the gas which remains in the fountain after the water is exhausted is mingled with the water in the reservoir, preparatory to delivering it into the fountain, thus effecting an important saving in gas. If necessary, the fountain may be provided with a suitable agitating device for thoroughly mixing the carbonic acid gas and the water.

I claim as my invention—

1. A continuous soda water apparatus, comprising a fountain, a permanent branch pipe connecting the water main with the upper part of the fountain, the liquid reservoir permanently interposed in said branch connection leading to the main, and above the top of the fountain whereby the intermediate part of the branch pipe will serve both as the liquid supply to the fountain and as the gas equalizing pipe between the fountain and liquid reservoir, and the gas supply vessel connected to the fountain, substantially as described.

2. A continuous soda water apparatus comprising a fountain a permanent branch pipe from the water main connecting with the top of the fountain, the water reservoir fixed permanently in said connection to the main, and above the top of the fountain so that the intermediate part of the branch pipe will serve as the liquid supply to the fountain and as the gas equalizing pipe between the reservoir and fountain the gas vessel connected to the fountain, the valves between the fountain and the gas and water vessels respectively, the relief valve for the water reservoir and the stem extending from each of said valves above the floor, substantially as described.

Witness my hand this 12th day of August, 1892.

FRED C. PECK.

Witnesses:
 CARL F. GEYER,
 FRED. C. GEYER.